United States Patent [19]

Olek

[11] Patent Number: 4,574,167
[45] Date of Patent: Mar. 4, 1986

[54] METHOD AND APPARATUS FOR CONFIGURABLE LINE TESTING

[75] Inventor: David J. Olek, Victor, N.Y.

[73] Assignee: TII Computer Systems, Inc., Copiague, N.Y.

[21] Appl. No.: 645,461

[22] Filed: Aug. 29, 1984

[51] Int. Cl.$^4$ ............................................. H04B 3/46
[52] U.S. Cl. ........................................... 179/175.3 R
[58] Field of Search ......... 179/175.3 R, 175, 175.2 C, 179/175.2 D; 375/10; 371/22; 370/14

[56] References Cited

U.S. PATENT DOCUMENTS 4,438,298  3/1984  Rubin ........................... 179/175.3 R

OTHER PUBLICATIONS

Lordel Manufacturing Company, Automatic Line Test Set, Lordel T-9/15, pp. 16, 17, undated.

*Primary Examiner*—Stafford D. Schreyer
*Attorney, Agent, or Firm*—Pennie & Edmonds

[57] ABSTRACT

A method and apparatus are provided for eliminating the need to access those telephone lines that do not have to be tested while still using the sequential line accessing capabilities of the central office switching equipment. As a result dial access time is minimized without the penalty of having to test non-operational lines. This is accomplished by creating an exceptions list which identifies each line that is not to be tested, by creating a record of the next telephone line to be tested, by comparing this record against the exceptions list. If the next line to be tested appears on the exceptions list, the record of the number of the line to be tested is again incremented and such record is again compared with the exceptions list. When a number is reached that does not appear on the exceptions list, that number is then tested, the record is incremented and the process continues. Advantageously, the record of the numbers being tested and the exceptions list are maintained in registers controlled by a microprocessor in the supervisor unit described in the above referenced applications, and the comparison between the record and the exceptions list is made by that microprocessor.

2 Claims, 2 Drawing Figures

METHOD AND APPARATUS FOR CONFIGURABLE LINE TESTING

CROSS REFERENCE APPLICATIONS

Related applications incorporated herein by reference are "Method and Apparatus for Supervising The Accessing and Testing of Communication Systems" Ser. No. 645,478, filed Aug. 29, 1984, "Method and Apparatus for Testing Communications Systems" Ser. No. 645,479, filed Aug. 29, 1984 and "Method and Apparatus for Accessing Communications Systems" Ser. No. 645,875, filed Aug. 29, 1984, filed concurrently herewith and assigned to TII Computer Systems, Inc.

BACKGROUND OF THE INVENTION

This invention relates to the maintenance and testing of communication lines, and in particular, conventional telephone lines. As explained at length in the above referenced applications, communication lines require periodic maintenance, testing and repair. Under such circumstances, it is desirable to provide a program of preventive maintenance in which each telephone line is tested systematically to determine if it is operating properly. Such testing advantageously is performed when individual phone lines are not likely to be used, such as late at night. Because the number of faulty lines that are likely to be detected is relatively small, it is also advantageous to be able to test a large number of lines in one testing period and to generate a report relating to all the lines tested.

In testing telephone lines, however, a considerable amount of time is consumed in tasks that do not relate to the actual testing of operating lines. Thus, dialing time takes up a significant percentage of the total time allocated to the testing of individual lines. In addition, numerous lines at any telephone exchange will not be in use at any given time and therefore will not be in need of any testing.

The time required to dial a group of telephone lines may be reduced by use of equipment available in the TTA unit described in the above referenced "Method and Apparatus for Maintaining Communications Systems". Such equipment takes advantage of the central office switching equipment so as to be able to access the next telephone line in numerical order from a line presently accessed. As a result, when a test is completed on one telephone line, the very next telephone line can be accessed simply by transmitting a control signal to the central office switching equipment. This makes it possible to successively step through the telephone lines in an exchange without losing significant time because of dialing delays. Such apparatus, however, has the disadvantage that it steps through every line in the exchange regardless of whether it is operating or otherwise available for testing. As a result, significant time is lost in accessing non-operational lines and lines that are not otherwise available.

SUMMARY OF THE INVENTION

In accordance with the invention, a method and apparatus are provided for eliminating the need to access those telephone lines that do not have to be tested while still using the sequential line accessing capabilities of the central office switching equipment. As a result dial access time is minimized without the penalty of having to test non-operational lines.

This is accomplished by creating an exceptions list which identifies each line that is not to be tested, by creating a record of the next telephone line to be tested, and by comparing this record against the exceptions list. If the next line to be tested appears on the exceptions list, the record of the number of the line to be tested is again incremented and such record is again compared with the exceptions list. When a number is reached that does not appear on the exceptions list, that number is then tested, the record is incremented and the process continues. Advantageously, the record of the numbers being tested and the exceptions list are maintained in registers controlled by a microprocesser in the supervisor unit described in the above referenced applications, and the comparison between the record and the exceptions list is made by that microprocessor. As a result, any telephone line that does not have to be tested can simply be skipped and the time that it would otherwise take to test such line is saved.

BRIEF DESCRIPTION OF THE DRAWINGS

These and other objects, features and advantages of the invention will be more readily apparent from the following detailed description of the preferred embodiment in which.

DETAILED DESCRIPTION OF THE PREFERRED EMBODIMENT

Figure 1:
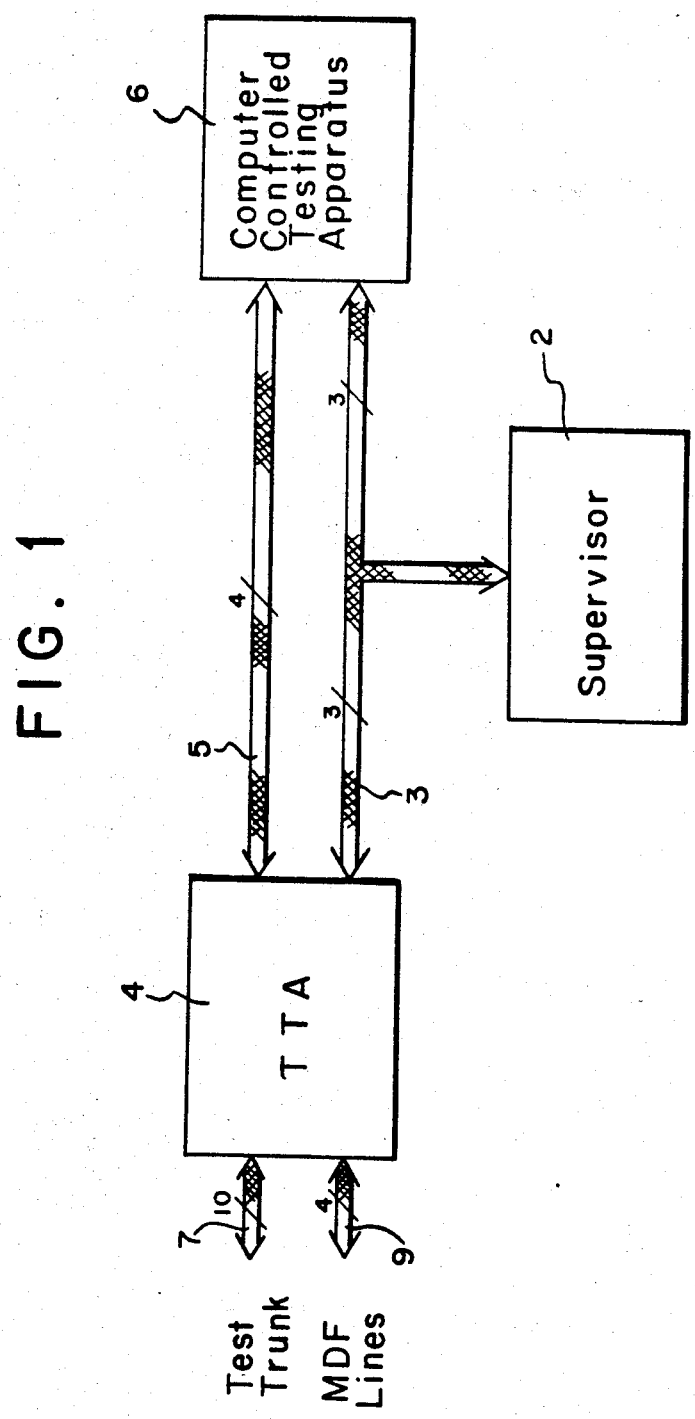
FIG. 1 is a block diagram showing the presently preferred embodiment of testing apparatus in which the invention may be used.

As shown in FIG. 1, a complete system for maintenance and testing of communication lines comprises a supervisor unit 2, a test trunk access (TTA) unit 4 and a testing unit 6. Both the supervisor and TTA units are described in detail in the above-referenced application "Method and Apparatus for Supervising the accessing and Testing of Communication Systems" and "Method and Apparatus for Acessing Communications Systems", respectively, and the testing unit is described in the above referenced application "Method and Apparatus for Testing Communications Systems" both of which are incorporated herein by reference. The supervisor is connected to the testing unit and to the TTA unit by a serial synchronous interface using a three-wire line 3. The TTA unit is connected to the testing unit by a four-wire line 5. When a given communication line wire pair is to be tested, the supervisor unit instructs the TTA to access the pair using ten-wire test trunk line 7 or four-wire MDF line 9.

When the TTA seeks to access lines, the unit may perform some preliminary tests to determine whether the lines can be seized. If possible, the TTA unit seizes the selected communication line(s), couples them to four-wire line 5, and informs the supervisor that a successful line seizure has occurred. The supervisor, through three-wire line 3, then instructs the testing unit to test the seized line(s) using line 5 coupled thereto. The testing unit notifies the supervisor unit when testing is completed and transmits the test results to said unit over line 3. The supervisor software then performs any further calculations required to determine line characteristics.

Figure 2:
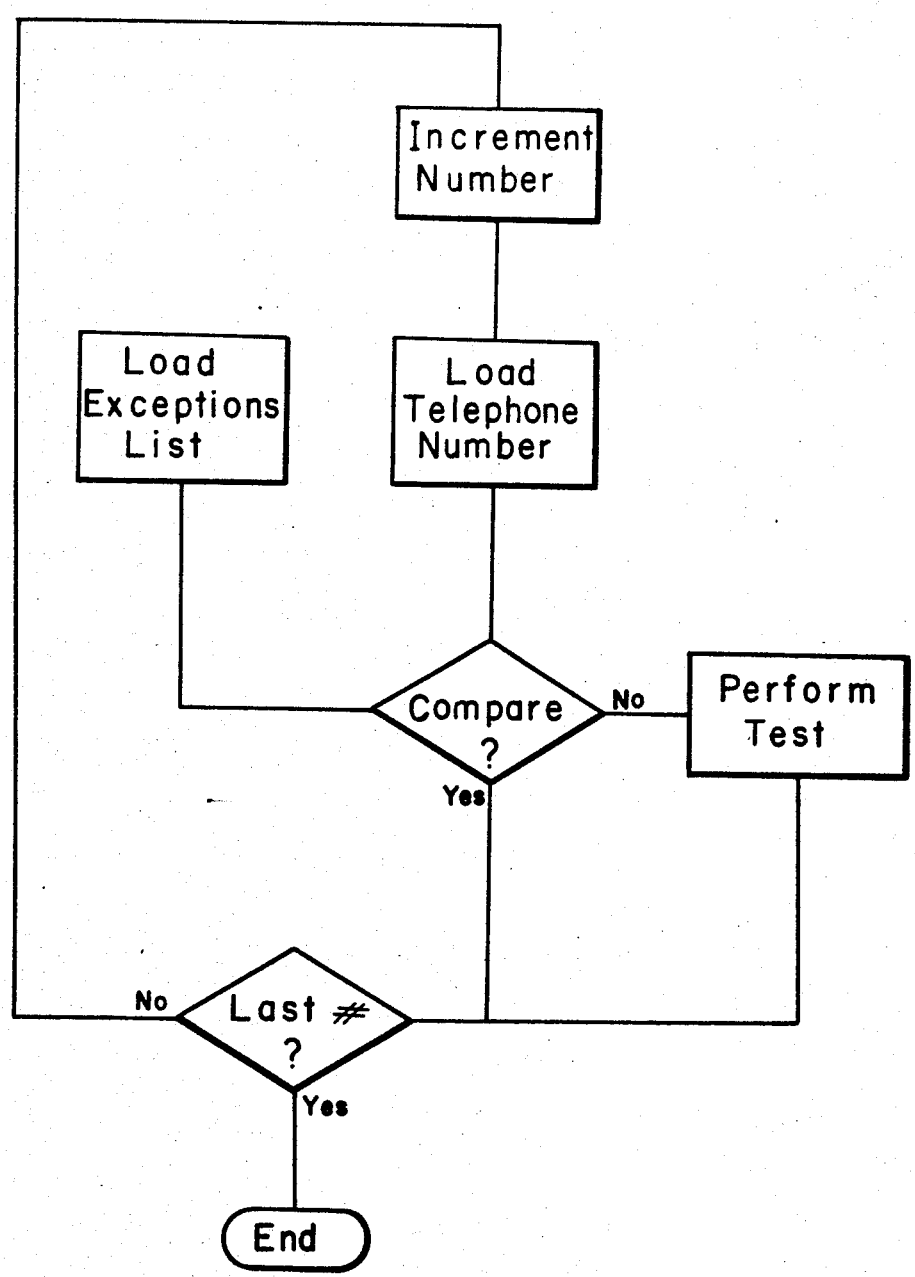
FIG. 2 is a flow chart setting forth a preferred method of practicing the invention.

As indicated in "Method and Apparatus for Supervising the Accessing and Testing of Communication Systems", supervisor 2 includes a microprocessor 10 which controls the operation of the supervisor unit and supervises the operation of TTA unit 4 and testing unit 6 in accordance with the invention. The microprocessor maintains in read/write memory 160 an exceptions list that identifies the telephone lines that are not to be tested during a testing session. This list, for example, can be loaded into read/write memory 160 by known means at the time the testing session is set up. The microprocessor also defines in any suitable portion of read/write memory 160 a register in which it records the number of the next telephone line to be accessed. In accordance with the invention, it then compares the record of the next telephone line to be accessed with the exceptions list to determine if the record is on the list. If it is, the record of the number of the line to be tested is incremented by one so as to skip that number and the newly incremented number is compared with the exceptions list. This process continues until a number is reached that does not appear on the exceptions list. At that point, the microprocessor introduces a prescribed test of the telephone line such as one or more of the tests designed in the above referenced application "Methods and Apparatus for Testing Communications Systems". The record is also incremented, and when the test is completed, the newly incremented record is compared against the exceptions list and the process continues. As a result, any telephone line that does not have to be tested can simply be skipped and the time that it would otherwise take to test such a line is saved. A flow chart illustrating this process is shown in FIG. 2.

As will be apparent to those skilled in the art, the exceptions list and the record of the next telephone line to be tested can be stored by the microprocessor in numerous ways. The comparison of this information can likewise be made under software control using many different techniques such as an Exclusive OR. Numerous other modifications within the scope of the invention will be apparent to those skilled in the art.

What is claimed is:

1. A method for testing telephone lines in numerical order without the need to access certain telephone lines in such order comprising the steps of:

creating an exceptions list which identifies each line that is not to be tested, creating a record of the next telephone line to be tested, comparing said record against said exceptions list, testing the telephone line only when a number is reached that does not appear on the exceptions list, incrementing said record, and comparing the incremented record with the exceptions list.

2. Apparatus for testing telephone lines in numerical order without the need to access certain telephone lines in such order comprising:

means for storing an exceptions list which identifies each line that is not to be tested, means for storing a record of the next telephone line to be tested, means for comparing said record against said exceptions list, and means for incrementing said record if the next line to be tested appears on the exceptions list and comparing the incremented record with the exceptions list or for initiating a test of that telephone line when a number is reached that does not appear on the exceptions list.

* * * * *